United States Patent [19]
Checchio

[11] Patent Number: 6,052,675
[45] Date of Patent: Apr. 18, 2000

[54] METHOD AND APPARATUS FOR PREAUTHORIZING CREDIT CARD TYPE TRANSACTIONS

[75] Inventor: Robert Anthony Checchio, Dunellen, N.J.

[73] Assignee: AT&T Corp., New York, N.Y.

[21] Appl. No.: 09/063,654

[22] Filed: Apr. 21, 1998

[51] Int. Cl.[7] .................................................. G06F 17/60
[52] U.S. Cl. .................................. 705/44; 705/39; 705/40
[58] Field of Search ...................................... 705/40, 44, 1, 705/16, 17, 18, 39, 42; 902/3, 4, 5

[56] References Cited

U.S. PATENT DOCUMENTS

| | | | |
|---|---|---|---|
| 4,594,663 | 6/1986 | Nagata et al. | 705/17 |
| 4,988,849 | 1/1991 | Sasaki et al. | 235/379 |
| 5,128,983 | 7/1992 | Tanaka | 379/91.01 |
| 5,329,589 | 7/1994 | Fraser et al. | 379/91 |
| 5,420,926 | 5/1995 | Low et al. | 380/24 |
| 5,444,616 | 8/1995 | Nair et al. | 705/17 |
| 5,485,510 | 1/1996 | Colbert . | |
| 5,705,798 | 1/1998 | Tarbox | 235/379 |
| 5,812,668 | 9/1998 | Weber | 380/24 |

OTHER PUBLICATIONS

Carson, Teresa. 'Money Fund Account with Trimmings,' May 10, 1982, p. 1, (full document) [online] American Banker [retrieved on Jul. 17, 1999].

*Primary Examiner*—Eric W. Stamber

[57] ABSTRACT

The method and apparatus for pre-authorizing transactions includes providing a communications device to a vendor and a credit card owner. The credit card owner initiates a credit card transaction by communicating to a credit card company data base, and storing therein, a distinguishing piece of information that characterizes a specific transaction to be made by an authorized user of the credit card at a later time. The information is accepted as "network data" in the data base only if a correct personal identification code (PIC) is used with the communication. The "network data" will serve to later authorize that specific transaction. The credit card owner or other authorized user can then only make that specific transaction with the credit card. Because the transaction is pre-authorized, the vendor does not need to see or transmit a PIC. In addition, if the credit card is lost or stolen, it cannot be used because all sales using the credit card must be pre-authorized using the confidential PIC.

28 Claims, 3 Drawing Sheets

METHOD AND APPARATUS FOR PREAUTHORIZING CREDIT CARD TYPE TRANSACTIONS

BACKGROUND OF THE INVENTION

1. Field of Invention

This invention relates to a method and apparatus for authorizing credit card or bank card transactions. In particular, this invention concerns preauthorizing a credit card for a particular transaction and subsequently initiating the authorized transaction at a vendor location using the credit card via a credit card authorization device.

2. Description of Related Art

Credit card validation devices and methods are known in which a credit card vendor communicates with a credit card company to determine whether a credit card has been reported as missing or stolen and/or whether there is sufficient credit to make a particular purchase. Conventionally, a user is only subjected to a verification process to determine whether the user is authorized to use a credit card when the user is making a purchase at a vendor's location. According to the conventional process, a vendor should, but does not always, compare the customer signature to the signature on the back of the credit card to determine whether the customer is the authorized user of the credit card. If the signatures do not match, the vendor must refuse the credit card transaction and, presumably, call the police and the credit card company to inform them that the credit card may be stolen.

This visual authorization check creates numerous problems for both the customer and vendor. First, the vendor is required to make a personal judgment as to whether signatures "match." Because this decision is subjective, and because vendors are under the pressure of reaching sales goals and retaining good will in the community, their judgment as to whether signatures match can be biased to avoid embarrassment and retain business. In fact, many vendors, due to either time constraints or a desire to make sales goals, do not even look at a customer's signature to determine whether the customer is an authorized user of the credit card.

Furthermore, in many instances, the customer is not located within view of the vendor, as in the case of mail order purchases, telephone purchases and internet purchases. The conventional method for using a credit card in a mail order purchase, telephone order purchase or other remotely ordered purchase does not include a verification process to verify that the user of the credit card is authorized to make the purchase. Currently, vendors have no apparatus or method to verify that a user is an authorized user of a credit card when the purchase is being initiated at a location remote from the vendor, e.g., by mail, telephone, facsimile, or computer. As a result of the above-mentioned problems, credit card companies have incurred great costs in providing purchase credit to unauthorized users of credit cards.

U.S. Pat. No. 5,485,510 to Colbert discloses a secure credit/debit card authorization device. The device is used to allow a credit card user to conduct a transaction over phone lines without transmitting the credit card number to the vendor. Accordingly, the device provides a secure system for transacting credit card purchases. In use, a credit card holder calls the credit card company which authorizes the credit card holder to make a particular purchase by providing an authorization code to the credit card holder. The credit card holder then makes a purchase by supplying the authorization code (not the credit card number) to a vendor. The vendor charges the credit card company by using the authorization code to charge against the credit card. Accordingly, the credit card number is never shown to the vendor and is only known to the credit card holder and the credit card company, ensuring its security.

The credit/debit card authorization device is not concerned with preauthorizing use of a credit card so that only specific transactions can be made using the credit card. In addition, the credit/debit card authorization device does not provide the benefit of allowing a vendor or credit card company to permit a transaction only when a user is authorized, regardless of whether the user is located at the vendor location or is communicating via phone, facsimile, Internet or other communication device.

Thus, the industry lacks a device and objective method that can be used during a sale, either at a vendor location or at a location remote from the vendor, which quickly, inexpensively, reliably and without embarrassment authorizes a user to use a particular credit card and to make a particular credit card transaction.

SUMMARY OF THE INVENTION

It is therefore an object of the invention to provide an authorization method and apparatus which pre-stores transaction information and allows vendors to determine whether a user at any location is authorized to use a particular card for a particular transaction.

A further object of the invention is to reduce costs incurred to credit card companies due to unauthorized use of credit cards.

Another object of the invention is to avoid embarrassment for both the vendor and credit card user by eliminating the need for the vendor to compare the signature on a credit card to the credit card user's signature.

Yet another object of the invention is to provide a more accurate and objective method for authorizing a credit card user's use of a credit card.

Still another object of the invention is to allow a vendor to verify that a user is an authorized user of a credit card and provide authorization for purchases initiated by mail, telephone, facsimile, computer or other communication devices located remote from the vendor.

Another object of the invention is to provide the primary authorized user of a credit card the ability to monitor, schedule and limit the use of the credit card by any secondary authorized users of the credit card.

A still further object of the invention is to provide a credit card owner a greater sense of security and to discourage credit card theft by making a credit card worthless to an unauthorized user.

In accordance with an aspect of the invention, a method for permitting a transaction by an authorized user includes the steps of receiving, in an evaluation system, authorized user transaction information which is transmitted to the evaluation system at the request of a principal authorized user, receiving, in the evaluation system, vendor transaction information which is transmitted to the evaluation system at the request of a person who may or may not be an authorized user to conduct a transaction and permitting a transaction when the vendor transaction information corresponds to the authorized user transaction information.

In accordance with another aspect of the invention, the method for authorizing a transaction by an authorized user comprises the steps of, prior to initiating the transaction, storing a pre-set personal identification code for an authorized user in an evaluation system, providing an authorized user with the pre-set personal identification code, receiving, in the evaluation system, a first personal identification code which is transmitted to the evaluation system at the request of a person who may or may not be an authorized user, and not authorizing the transaction when the first personal identification code does not correspond to the pre-set personal identification code stored in the evaluation system. The method further includes receiving and storing, in the evaluation system, authorized transaction information transmitted to the evaluation system at the request of the person when the first personal identification code corresponds to the pre-set personal identification code. In addition, the method includes receiving, in the evaluation system, vendor transaction information transmitted to the evaluation system at the request of a consumer who may or may not be an authorized user; and authorizing the transaction when the vendor transaction information corresponds to the authorized transaction information.

In accordance with another aspect of the invention, a method for conducting a transaction by an authorized user comprises the steps of storing a pre-set personal identification code for a principal authorized user in an evaluation system, providing the principal authorized user with the pre-set personal identification code, receiving, in the evaluation system, a user personal identification code which is transmitted to the evaluation system at the request of a user, comparing the user personal identification code with the pre-set personal identification code and storing in the evaluation system, when the user personal identification code transmitted at the request of the user corresponds to the pre-set personal identification code stored in the evaluation system, user transaction information entered at the request of the user. The method further includes receiving, in the evaluation system, at least one of a vendor transaction information and a consumer personal identification code which is transmitted to the computer at the request of a consumer, and conducting the transaction at the request of the consumer when at least one of the user transaction information stored in the evaluation system and the pre-set personal identification code corresponds to at least one of the vendor transaction information and consumer personal identification code, respectively.

In accordance with still another aspect of the invention, an apparatus for authorizing a transaction by an authorized user comprises an evaluation system, means for receiving, in the evaluation system, authorized user transaction information which is transmitted to the evaluation system at the request of a principal authorized user, means for receiving, in the evaluation system, vendor transaction information which is transmitted to the evaluation system at the request of a user, and means for permitting the transaction when the vendor transaction information corresponds to the authorized user transaction information.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1A:
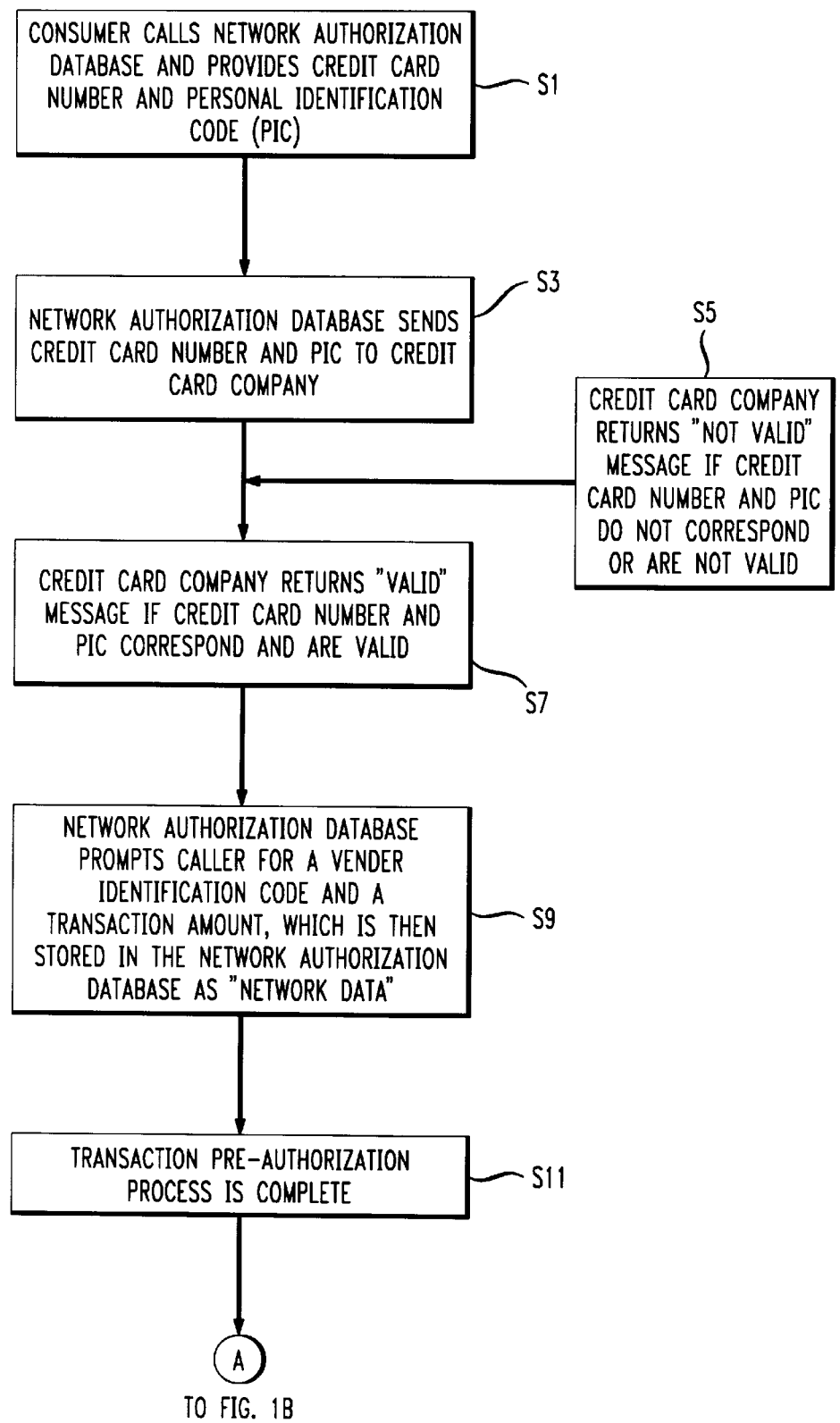
FIGS. 1A and 1B each show a flowchart of steps in accordance with an embodiment of the invention.

While the invention will hereinafter be described in connection with preferred embodiments thereof, it will be understood that it is not intended to limit the invention to those embodiments. On the contrary, it is intended to cover all alternatives, modifications, and equivalents that may be included within the spirit and scope of the invention as defined by the claims.

For a general understanding of the features of the invention, reference is made to the drawings. In the drawings, like reference numerals have been used throughout to designate similar elements.

Figure 1B:
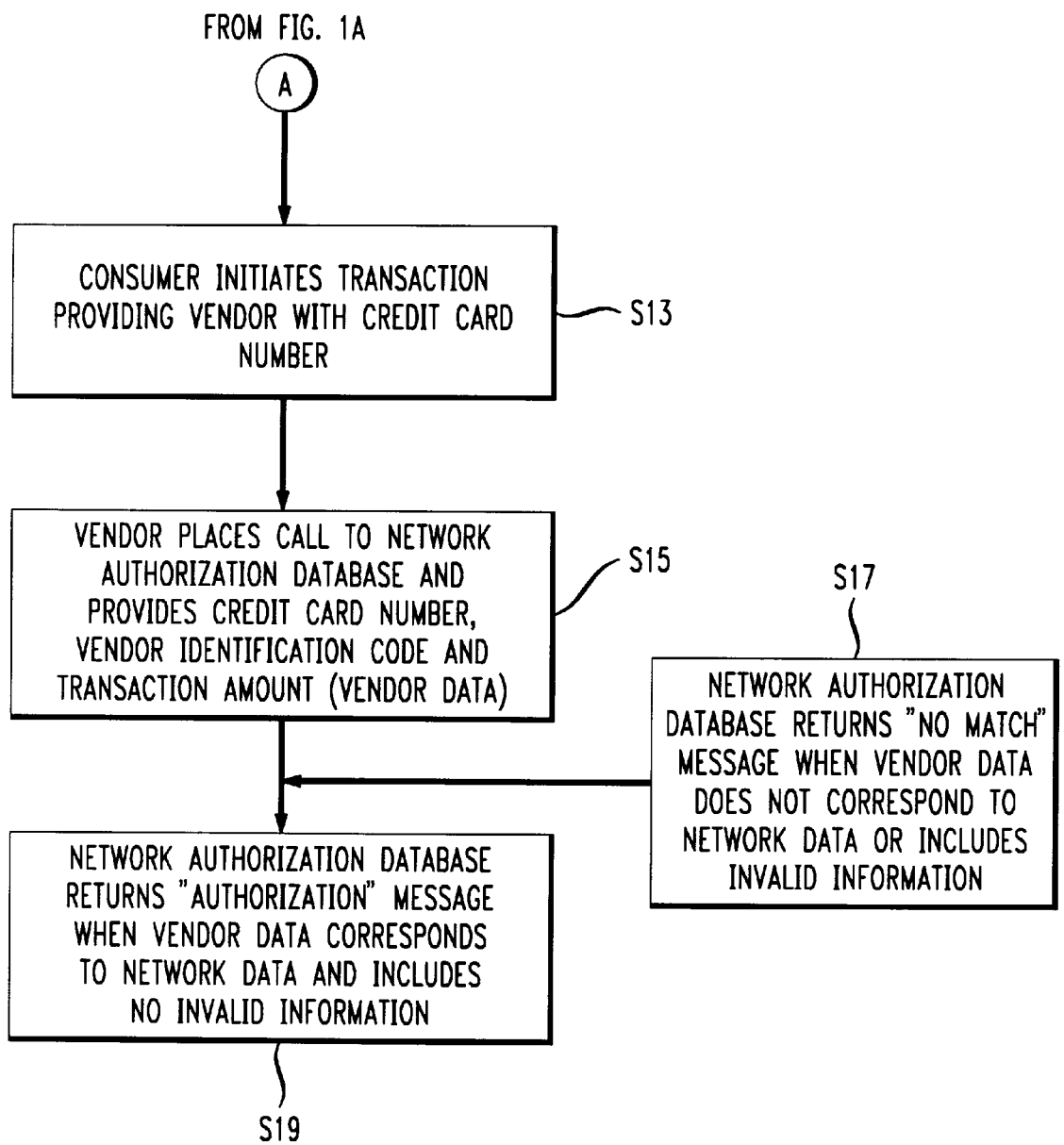

FIGS. 1A and 1B show a flowchart of method steps in accordance with an embodiment of the invention. At step S1, a consumer, who is the owner of the credit card and is considered a primary authorized user of the credit card, calls an evaluation system, for example a network authorization database, as shown, or a mainframe computer located at a credit card company, and provides a card number and an associated personal identification code (PIC) to the network authorization database. The credit card number and the PIC are issued to the consumer at a time prior to step S1 and are known only to the credit card company and the consumer to whom the credit card is issued. If the credit card is lost or stolen, the credit card number may become known by persons other than the consumer to whom the credit card is issued. In such an instance, only the PIC will be confidentially known to the credit card company and the consumer to whom the credit was originally issued. Therefore, the disclosed method and apparatus provides a credit card that can not be used by an unauthorized user of the credit card, i.e. a user who does not know the PIC, because, in accordance with the invention, the credit card cannot be used without knowledge of the PIC.

At step S3, the network authorization database compares the credit card number and PIC provided by the consumer at step S1 to the credit card number and PIC known to the credit card company. The credit card number and PIC may be stored in a separate memory in the network authorization database or may be stored in any other known manner for comparison, for example, on a document listing.

The credit card company compares the credit card number and PIC stored in the network authorization database with the credit card number and PIC provided by the consumer, and returns a "not valid" message at step S5 if the credit card number and PIC provided by the consumer at step S1 do not match the credit card number and PIC stored in the network authorization database. The credit card company also returns a "not valid" message if the credit card has been reported as stolen or lost or the purchase limit has been exceeded for the credit card, even if the credit card number and PIC provided by the consumer match the credit card number and PIC stored in the network authorization database.

The credit card company returns a "valid" message at step S7 if the credit card number and PIC provided by the consumer match the credit card number and PIC stored in the network authorization database, and the credit card is otherwise valid.

Once the consumer receives a "valid" message from the network authorization database, the consumer is requested to provide "network data" or vendor information at step S9 by pressing keys on a telephone or typing the information into a computer memory or even communicating the information by voice. The network data or vendor information can include a vendor identification code and a lease amount or purchase amount which are stored in the network authorization database. The network data or vendor information can also include other types of information, for example, vendor name, type of lease, type of purchase, date of sale, category of merchandise, location of the vendor or any other relevant piece of information related to a particular purchase or particular lease or particular vendor or particular user of the credit card that would serve to distinguish a particular purchase or lease transaction.

After the network authorization database has verified that the credit card number and PIC are valid and has received the vendor information from the consumer, the preauthorization process is deemed complete at step S11.

FIG. 1B shows the progression of method steps, continued from FIG. 1A, for making an authorized purchase in accordance with the preferred embodiment of the invention.

At step S13, a consumer initiates a transaction by providing the vendor with a credit card number. The vendor may be any type of vendor, including a mail order vendor, telephone order vendor, facsimile order vendor and Internet vendor. The vendor places a call, or otherwise communicates, to the network authorization database at step S15 and provides the credit card number and vendor data to the network authorization database. The vendor data as shown in FIG. 1B includes a vendor identification code and a transaction amount. However, as discussed with regard to the network data or vendor information input at step S9 by the authorized user, the vendor data alternatively can comprise many other types of information that distinguish a consumer's intended or permitted purchase, lease or other transaction.

At step S17, the network authorization database returns a "no-match" message to the vendor when the vendor data is not identical to or does not otherwise correspond to the network data previously stored in the network authorization database during the preauthorization process. The network authorization database also returns a "no-match" message if the communication from the vendor to the network authorization database includes any invalid information or if the credit card has been reported as lost or stolen or does not have the requisite credit limit.

If the vendor data is identical to, or otherwise corresponds to, the network data and does not include invalid information, the network authorization database returns an "authorization" message to the vendor at step S19. Accordingly, the consumer is considered to be an authorized credit card user and the purchase, lease or other transaction requiring authorization is permitted.

Figure 2:
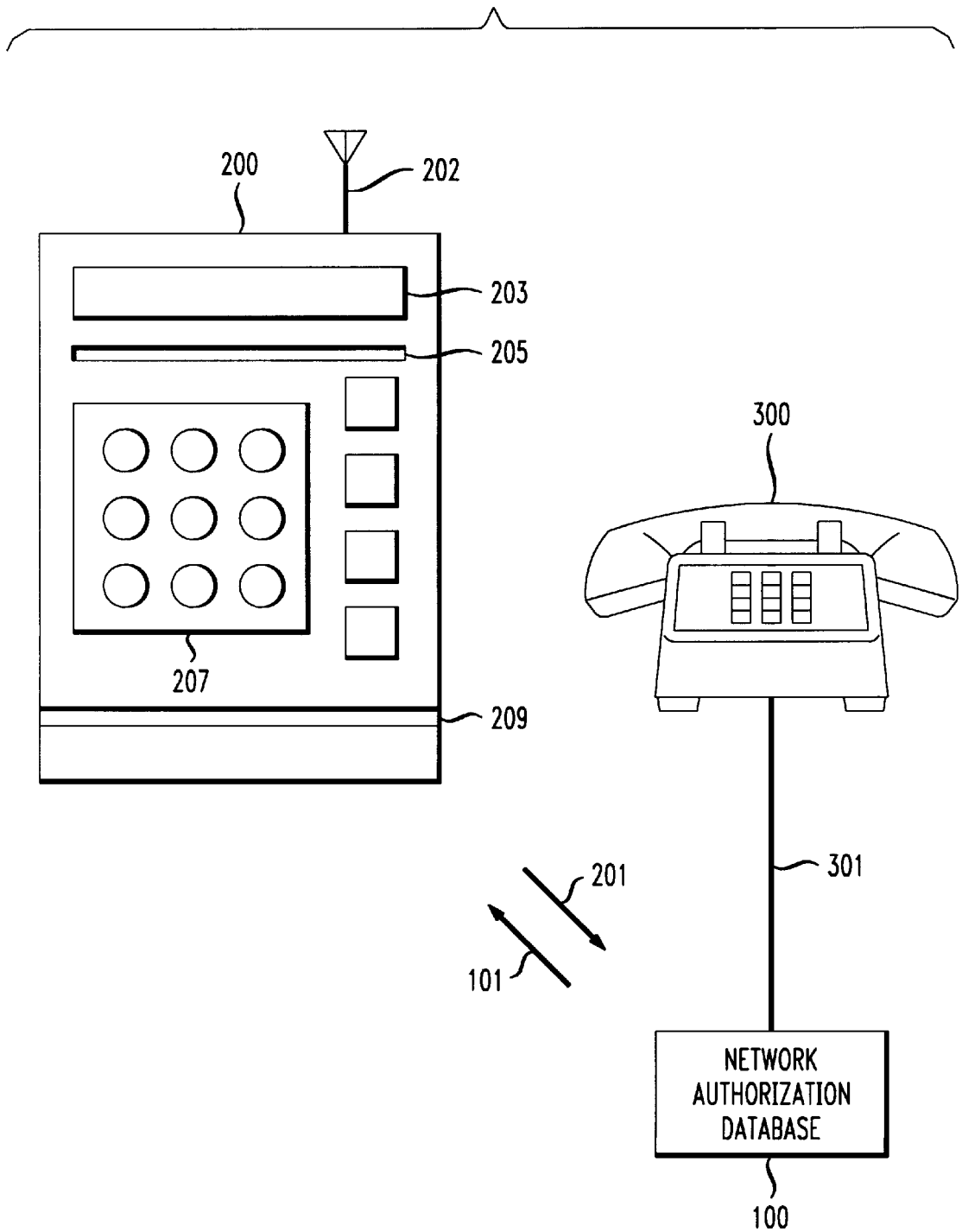
FIG. 2 is an elevational view of a device for authorizing a transaction in accordance with an embodiment of the invention.

FIG. 2 is an elevational view showing an apparatus for pre-authorizing credit card transactions in accordance with the invention. The network authorization database 100 is located at a credit card company facility and receives information 201 from a vendor and communicates information 101 to a vendor by a wireless communication device integrated into a vendor information device 200. The network authorization database 100 can also receive information 301 from a consumer via a consumer communication device 300, such as a telephone. Alternative communication devices can be used in place of the wireless communication device or telephone, such as a computer, PCS communication device, cellular telephone, or other communication devices.

The vendor information device 200 may include a credit card slot 209 for passing a credit card or other bank type card therethrough to electronically read information stored on the magnetic strip of the credit card. Other information, such as vendor information, may be entered through a keyboard 207 and, alternatively, can be input by a bar code reader, touch screen, voice input or other type of data input mechanism. Information that is entered or received into the vendor information device 200 can be displayed on an electronic display 203 or a printer 205. The electronic display may be any type of display, including an LCD device, LED device, or computer display.

In operation, the invention allows a credit card owner to be certain that only authorized credit card purchases will be made with the owner's credit card. This is accomplished, in part, by using a PIC with the credit card and requiring entry of the PIC by the user when attempting to pre-authorize use of the credit card.

The invention has the advantage of providing automatic authorization of a credit card transaction. The invention does not rely on a vendor to judge whether a buyer's signature matches the signature on a credit card and, accordingly, avoids any embarrassment associated with a vendor's personal judgment that a signature does not match. Furthermore, because there is no personal judgment required, and because the vendor data entered by the buyer must match the network data at the credit card company computer before use of the credit card is authorized, the disclosed invention is more reliable in determining whether a buyer is an authorized user of the credit card.

Another advantage of the invention is that it can be implemented with little or no extra cost to the vendor. Many vendors already use credit card authorization devices that call a credit card company computer via a telephone to verify sufficient credit and to verify that the card has not been reported as lost or stolen. The disclosed invention can utilize this pre-existing equipment to communicate to the network data base and receive authorization from the network data base.

Wireless devices are not presently used for credit card purchase authorization because wireless communication is generally not secure. However, because the disclosed invention never requires the vendor to transmit the PIC, a third party who obtains only the credit card number from the insecure wireless communication would not be able to pre-authorize any transactions, and thus would still not be able to use the credit card.

In another embodiment of the invention, the credit card owner could be provided with multiple pre-set personal identification codes associated with one credit card account. The owner or primary credit card user could then provide secondary users with credit cards associated with the one account and determine different credit limits associated with each of the different cards to limit spending when the cards are being used. Accordingly, multiple users of a group, for example members of a family, could assign a particular card to each family member and distribute the credit corresponding to the family member's needs so that particular family members will have more or less purchasing power with respect to the other users of the credit card account. Furthermore, each family member could be assigned an individual password or code that must be included with the vendor information and match with the network data to obtain authorization for a particular purchase. Accordingly, the primary user would be the only person who knows the PIC for the account and who can pre-authorize transactions. Each of the secondary users could use the same credit card number, but spending power would be controlled by the primary authorized user of the credit card, i.e.—the parents.

The disclosed invention provides the advantage of allowing parents (or primary users) to more closely control the spending of their children (or secondary users) by allotting specific spending amounts to each specific account or password associated with the credit card. For example, a parent could pre-authorize $100 of spending to a child's campus bookstore to ensure that the child spends the allotted money on books. In addition, if a date is used to comprise the vendor information or "network data", a parent could pre-authorize spending only for particular days when a child will be traveling, shopping or doing any other authorized transactions.

In yet another embodiment of the invention, the use of a pre-authorization method and device for a credit-card type transaction can include promoting use of the method or device by including a step of providing a rebate or by including software or hardware that can credit a rebate to an individual. The rebate is given to either a user or a vendor when the user or vendor conducts a transaction using the pre-authorization method or device. Thus, the credit card company, bank or other financial institution benefits from less risk of liability from fraudulent use of the credit card or bank card, and the user or vendor benefits by obtaining a rebate, along with obtaining the heightened security provided by the invention. The rebate could comprise any number of items that would be of value to the user or vendor, including cash, trips or merchandise.

The invention has been described with reference to the above-described preferred embodiments, which are meant to be illustrative, not limiting. Various modifications can be made without departing from the spirit and scope of the embodiments of the invention as defined in the claims. For example, a bank card may be used instead of a credit card and the transaction may be one that does not involve a purchase, such as approving a loan.

What is claimed is:

1. A method for authorizing a transaction by an authorized user, comprising:
    prior to initiating the transaction, storing a pre-set personal identification code for an authorized user in an evaluation system;
    providing an authorized user with the pre-set personal identification code;
    receiving, in the evaluation system, a first personal identification code which is transmitted to the evaluation system at the request of a person who may or may not be an authorized user;
    preauthorizing the transaction when the first personal identification code corresponds to the pre-set personal identification code stored in the evaluation system; and
    receiving and storing, in the evaluation system, authorized transaction information in a request;
    receiving an identification from the authorized user at a vendor;
    receiving a contact from the vendor based on the identification supplied to the vendor after preauthorization;
    receiving, in the evaluation system, vendor transaction information of the vendor from the vendor via the contact; and
    authorizing the transaction when the vendor transaction information corresponds to the authorized transaction information.

2. The method of claim 1, further comprising:
    producing a billing statement when the vendor transaction information corresponds to the authorized transaction information.

3. The method of claim 1, further comprising:
    transmitting, to a display device at the location of the vendor, information indicating that the transaction is authorized when the vendor transaction information corresponds to the authorized transaction information, and information indicating that the transaction is not authorized when the vendor transaction information does not correspond to the authorized transaction information.

4. The method of claim 1, further comprising:
    transmitting, to an authorization device at the location of the vendor, authorization for the transaction when the vendor transaction information corresponds to the authorized transaction information.

5. The method of claim 1, further comprising:
    transmitting, to a display device at the location of the vendor, authorization information when the vendor transaction information corresponds to the authorized transaction information.

6. The method of claim 1, wherein the transaction is a credit card purchase.

7. A method for conducting a transaction by an authorized user, comprising:
    storing a pre-set personal identification code for a principal authorized user in an evaluation system;
    providing the principal authorized user with the pre-set personal identification code;
    receiving, in the evaluation system, a user personal identification;
    comparing the user personal identification code with the pre-set personal identification code;
    storing in the evaluation system, when the user personal identification code corresponds to the pre-set personal identification code, user transaction information;
    receiving, in the evaluation system, at least one of a vendor transaction information and a consumer personal identification code;
    receiving an identification from the authorized user at a vendor;
    receiving a contact from the vendor based on the identification supplied to the vendor; and
    conducting the transaction with the vendor when at least one of the user transaction information stored in the evaluation system or the pre-set personal identification code corresponds to at least one of the vendor transaction information and consumer personal identification code, respectively.

8. The method of claim 7, wherein the user transaction information includes at least one of a sales amount, a vendor identification, a date and a secondary user identification.

9. The method of claim 7, wherein the transaction is a credit card purchase.

10. The method of claim 7, further comprising:
    producing a billing statement when at least one of the user transaction information stored in the evaluation system and the pre-set personal identification code corresponds to at least one of the vendor transaction information and consumer personal identification code, respectively.

11. The method of claim 7, further comprising:
    transmitting, to a display device at the location of the vendor, information indicating that the transaction is authorized when at least one of the user transaction information stored in the evaluation system and the pre-set personal identification code corresponds to at least one of the vendor transaction information and consumer personal identification code, respectively; and
    transmitting, to the display device, information indicating that the transaction is not authorized when at least one of the user transaction information stored in the evaluation system and the pre-set personal identification code does not correspond to at least one of the vendor transaction information and consumer personal identification code, respectively.

12. The method of claim 7, further comprising:

transmitting, to an authorization device at the location of the vendor, authorization for the transaction when at least one of the user transaction information stored in the evaluation system and the pre-set personal identification code corresponds to at least one of the vendor transaction information and consumer personal identification code, respectively.

13. The method of claim 7, wherein the evaluation system comprises a computer.

14. A method for permitting a transaction by an authorized user, comprising:

preauthorizing in an evaluation system a request for the transaction of the authorized user for a vendor;

supplying the vendor with an identification provided by the authorized user;

receiving in the evaluation system after preauthorization a contact from the vendor for authorization of the transaction based on the identification received by the vendor; and authorizing in the evaluation system the transaction in a response to the vendor contact.

15. The method of claim 14, further comprising:

receiving first vendor information from the authorized user with the request; and receiving second vendor information from the vendor when the vendor contacts the evaluation system.

16. The method of claim 15, further comprising:

transmitting to a display device, at a location of the vendor, authorization information when the second vendor information corresponds to the first vendor information.

17. The method of claim 15, further comprising:

transmitting to an authorization device at a location of the vendor, authorization for the transaction when the second vendor information corresponds to the first vendor information.

18. The method of claim 15, wherein the second vendor information includes at least one of a sales amount, vendor identification code, a vendor name, and a secondary user identification.

19. The method of claim 15, further comprising:

producing a billing statement when the second vendor information corresponds to the first vendor information.

20. The method of claim 15, further comprising:

storing a pre-set personal identification code for an authorized user in the evaluation system;

providing an authorized user with the pre-set personal identification code;

receiving, in the evaluation system, a user personal identification code;

preauthorizing the transaction when the user personal identification code corresponds to the pre-set personal identification code stored in the evaluation system; and receiving and storing, in the evaluation system, the first vendor information when the user personal identification code corresponds to the pre-set personal identification code.

21. The method of claim 14, wherein the identification includes a credit card number.

22. The method of claim 14, wherein the evaluation system comprises a credit card company computer.

23. The method of claim 14, wherein the transaction is a credit card purchase.

24. An apparatus for authorizing a transaction by an authorized user comprising:

a memory; and an evaluation system that includes the memory, the evaluation system preauthorizing a request of a principal authorized user for the transaction, receiving, after preauthorization, a contact from a vendor based on an identification received by the vendor from the authorized user, and authorizing the transaction in a response to the vendor contact.

25. The apparatus of claim 24, wherein the request includes a first vendor information and the evaluation system receives a second vendor information from the vendor via the contact.

26. The apparatus of claim 25 wherein the evaluation system transmits to an authorization device at a location of the vendor, authorization for the transaction when the second vendor information corresponds to the first vendor information.

27. The apparatus of claim 25, wherein the second vendor information includes at least one of a sales amount, a vendor identification code, a date, and a merchandise code.

28. The apparatus of claim 24, wherein the transaction is a credit card purchase.

* * * * *